US008176888B2

(12) United States Patent
Reiche et al.

(10) Patent No.: US 8,176,888 B2
(45) Date of Patent: May 15, 2012

(54) METHOD FOR STARTING A MIXED FUEL ENGINE

(75) Inventors: David Bruce Reiche, Livonia, MI (US);
Jianwen James Yi, Canton, MI (US);
Steven Wooldridge, Saline, MI (US);
Foo Chern Ting, Canton, MI (US);
Thomas A. McCarthy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/027,104

(22) Filed: Feb. 14, 2011

(65) Prior Publication Data
US 2011/0265764 A1 Nov. 3, 2011

(51) Int. Cl.
*F01L 13/08* (2006.01)

(52) U.S. Cl. .................. 123/182.1; 123/685; 123/179.7; 123/179.8

(58) Field of Classification Search ............... 123/182.1, 123/179.7, 179.8, 685
See application file for complete search history.

(56) References Cited

U.S. PATENT DOCUMENTS

| | | | |
|---|---|---|---|
| 2,840,623 A | 6/1958 | Middleton | |
| 3,934,570 A | 1/1976 | Asik et al. | |
| 4,395,999 A | 8/1983 | McKechnie | |
| 4,446,842 A | 5/1984 | Iwasaki | |
| 4,459,967 A | 7/1984 | Hayashi | |
| 4,509,495 A | 4/1985 | Betz et al. | |
| 4,662,343 A | 5/1987 | Smith | |
| 4,677,960 A | 7/1987 | Ward | |
| 4,774,914 A | 10/1988 | Ward | |
| 4,993,386 A * | 2/1991 | Ozasa et al. | 123/25 J |
| 5,315,982 A | 5/1994 | Ward et al. | |
| 6,968,678 B2 * | 11/2005 | Le Leux et al. | 60/280 |
| 7,461,628 B2 * | 12/2008 | Blumberg et al. | 123/304 |
| 7,597,071 B1 * | 10/2009 | Hirs | 123/78 E |
| 7,597,072 B2 | 10/2009 | Stein et al. | |
| 7,753,013 B2 | 7/2010 | Hiyoshi et al. | |
| 8,069,839 B2 * | 12/2011 | Cohn et al. | 123/431 |
| 2007/0209630 A1 * | 9/2007 | Hiraya et al. | 123/197.4 |
| 2008/0127931 A1 * | 6/2008 | Kuo | 123/25 C |
| 2009/0114188 A1 | 5/2009 | Peters et al. | |
| 2009/0145382 A1 | 6/2009 | Kawai | |
| 2010/0000478 A1 | 1/2010 | Yoshikawa et al. | |
| 2010/0049424 A1 | 2/2010 | Tashima et al. | |

* cited by examiner

*Primary Examiner* — Erick Solis
(74) *Attorney, Agent, or Firm* — Allan J. Lippa; Alleman Hall McCoy Russell & Tuttle LLP

(57) ABSTRACT

A method for improving starting of an engine that may be operated with fuels having varying alcohol concentrations is presented. In one embodiment, the method adjusts a compression ratio of an engine in response to a number of combustion events after an engine stop and a concentration of alcohol in a fuel supplied to the engine. The method may make engine starting more repeatable at lower engine temperatures.

20 Claims, 9 Drawing Sheets

METHOD FOR STARTING A MIXED FUEL ENGINE

FIELD

The present description relates to a system for improving starting of an engine. The method may be particularly useful for engines that may operate on a combination of mixed fuels.

BACKGROUND AND SUMMARY

Alcohol based fuels are one alternative to oil based fuels such as gasoline. Alcohol fuels have a lower energy density as compared to the energy density of gasoline, but an alcohol based fuel can lower the possibility of engine knock since alcohol fuels can decrease cylinder temperatures via a higher heat of vaporization. Consequently, engines that operate with alcohol can make up for at least a portion of the difference in energy density between fuels via operating at conditions that may cause the same engine operating with gasoline to knock. However, engines that operate with higher concentration alcohol fuels may have a more difficult time starting at lower engine temperatures because it can be more difficult to vaporize alcohol in the engine at lower temperatures.

The inventors herein have recognized the above-mentioned disadvantages and have developed a method for starting an engine, comprising: adjusting an effective compression ratio of a cylinder and an amount of residual exhaust gas in the cylinder of the engine in response to a number of combustion events since engine stop and a concentration of alcohol in a fuel supplied to the cylinder during a first engine start; and adjusting the effective compression ratio to a compression ratio less than the compression ratio during the first engine start, and adjusting an amount of residual exhaust gas in the cylinder during the second engine start to less than the amount of residual exhaust gas in the cylinder during the first engine start during a second engine start where a concentration of alcohol in a fuel supplied to the cylinder during the second engine start is less than the concentration of alcohol in the fuel supplied to the cylinder during the first engine start.

By adjusting an effective compression ratio of a cylinder and an amount of residual exhaust gas in the cylinder in response to a number of combustion events since engine stop and a concentration of alcohol in a fuel supplied to the cylinder, it may be possible to provide more reliable engine starting while an engine is operated with higher concentrations of alcohol. For example, increasing a compression ratio of an engine as a concentration of alcohol in a fuel supplied to the engine increases may improve alcohol vaporization and combustion at lower temperatures. In particular, a compression ratio of an engine or cylinder can be set to a relatively high value for at least a first combustion event since engine stop so that engine compression work can be used to heat the fuel and improve fuel vaporization. However, it may not be desirable to keep the engine compression ratio at a high value since doing so may contribute to engine knock. The engine compression ratio may be reduced based on the amount of time the engine is operated, but time may have only a loose relationship to conditions in the cylinder that affect fuel vaporization and knock. Therefore, it may be more desirable and beneficial to decrease the engine compression ratio as a number of engine events increases instead of adjusting the compression ratio solely with respect to time.

The present description may provide several advantages. In particular, the approach may improve engine starting consistency. In addition, the approach may improve engine starting when an engine is started with a higher concentration alcohol fuel. Further, the approach can adjust engine operation for a variety of alcohol concentrations so that the engine may be operated with fuels that have a wide range of alcohol concentration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving starting of an engine that may be operated with fuel that may vary in alcohol concentration. In one non-limiting example, the engine may be configured as illustrated in FIG. 1.

Figure 6:
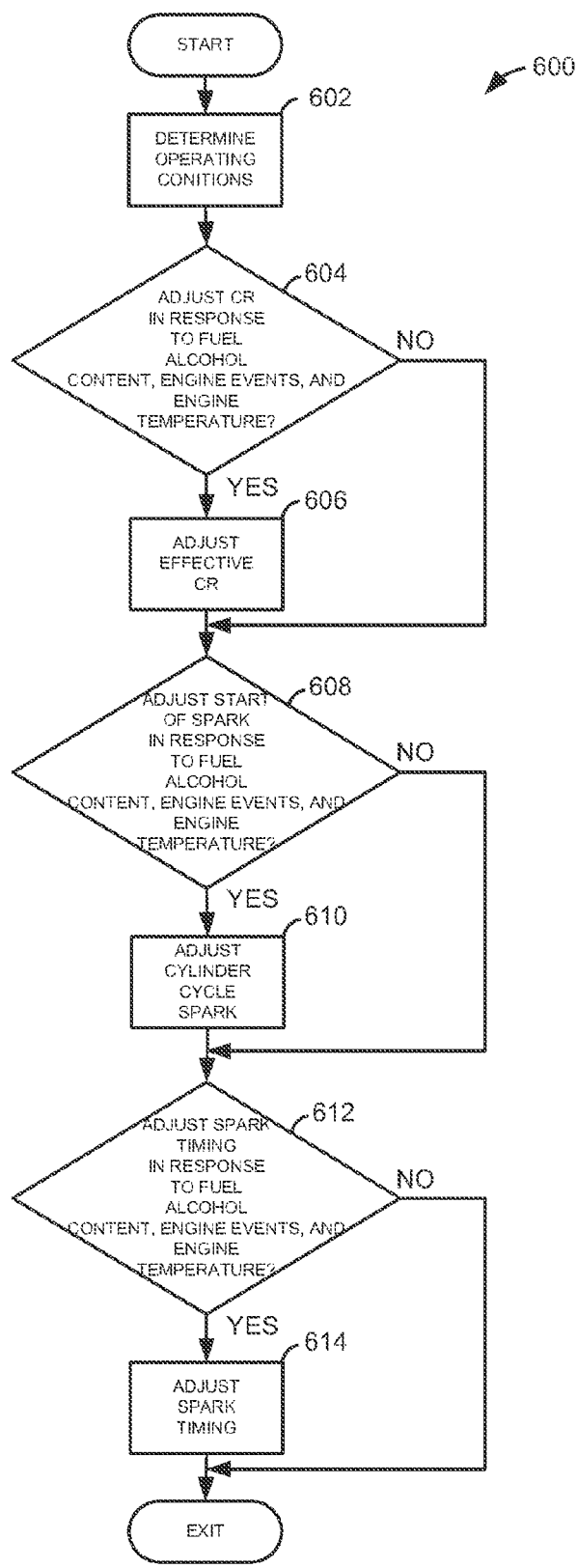
FIG. 6 is a high level flowchart for starting an engine.
Figure 7:
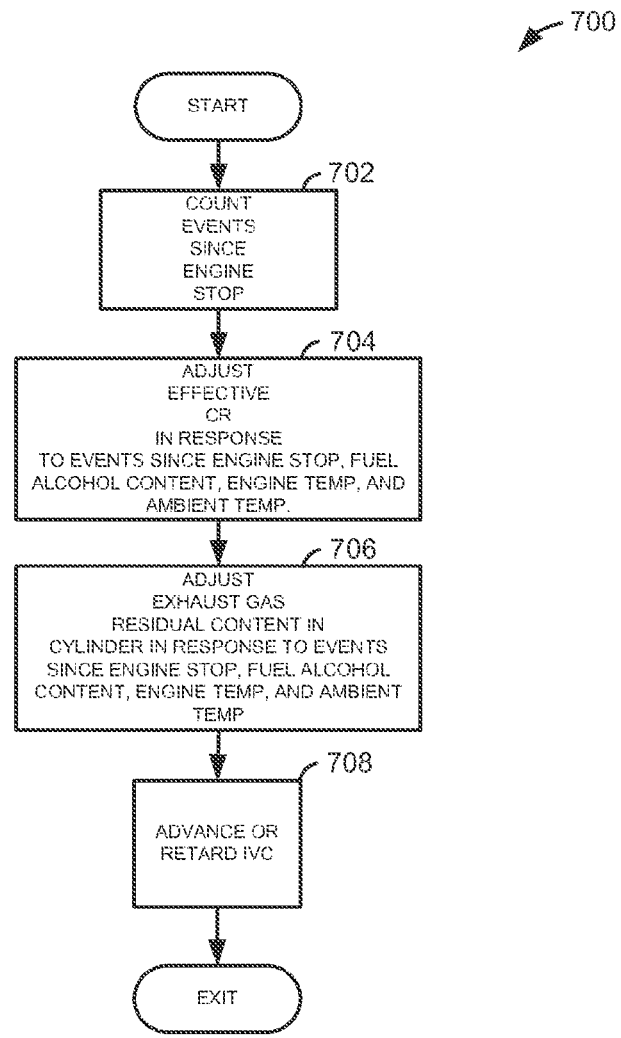
FIG. 7 is a flowchart for adjusting engine compression ratio for engine starting.
Figure 8:
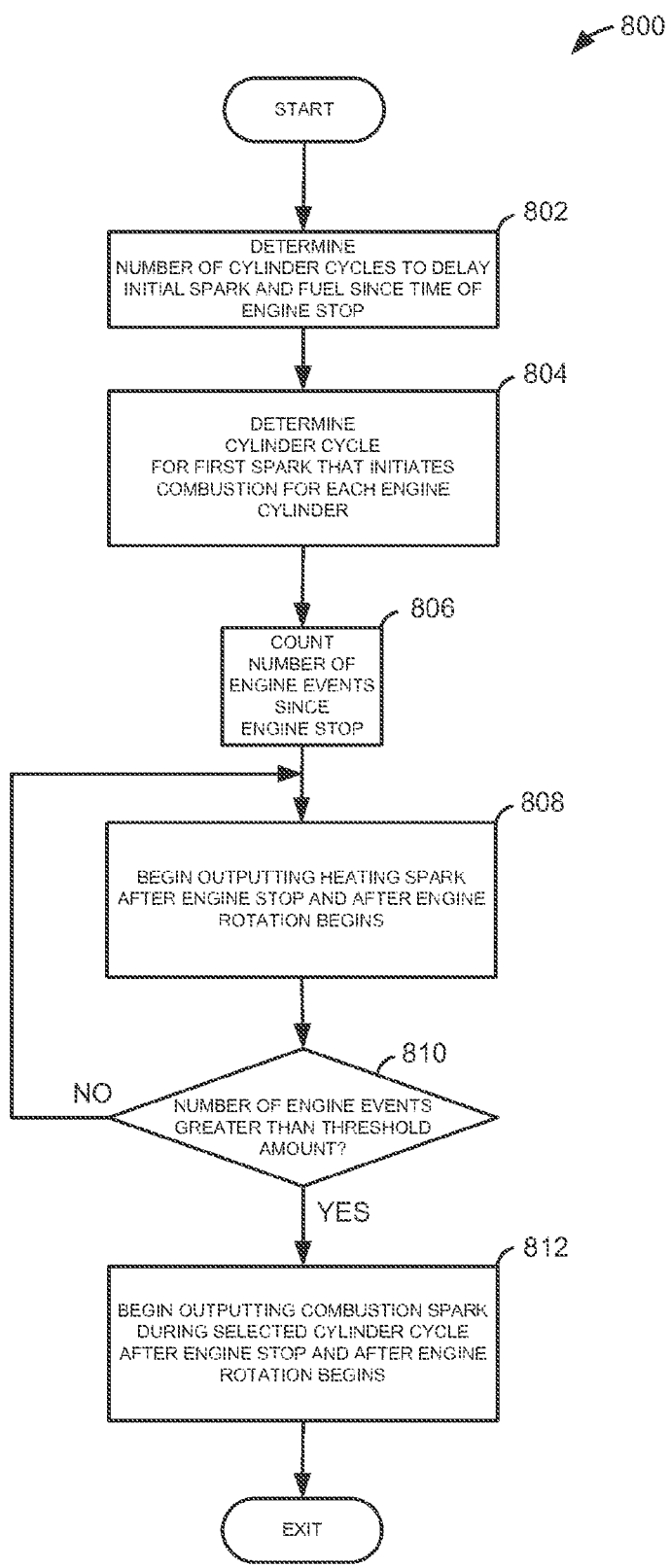
FIG. 8 is a flowchart for delaying combustion to improve engine starting.
Figure 9:
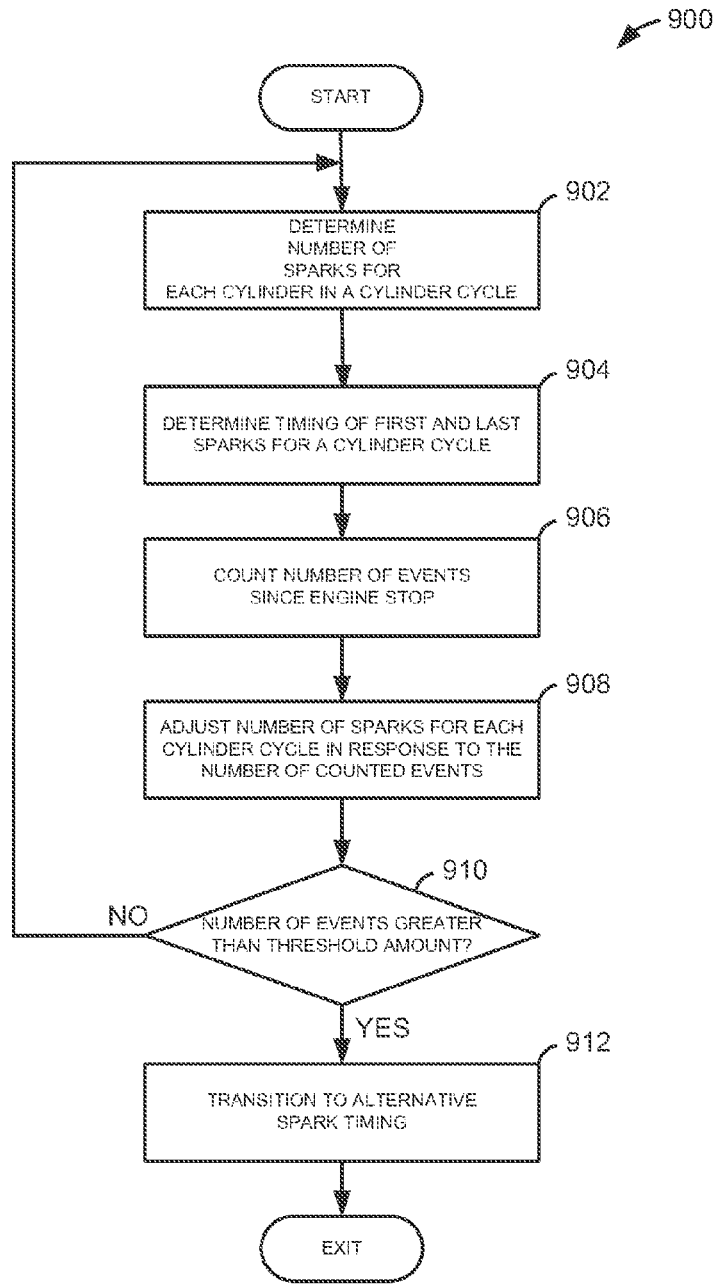
FIG. 9 is a flowchart for adjusting spark timing of an engine for engine starting.

Engine starting may be performed according to the methods described by FIGS. 6-9. The methods may improve engine starting for an engine that may operate with varying concentrations of alcohol in the fuel combusted by the engine. The method of FIG. 6 provides an overall approach for controlling engine starting. FIGS. 7-9 provide more specific details for adjusting engine actuators that may affect engine starting. Thus, the methods described in FIGS. 6-9 can be used during engine starting to improve the consistency of combustion. In some of the described examples, an air-fuel mixture near a spark plug may be adjusted to improve the possibility of combustion in the cylinder. The air-fuel mixture near the spark plug may be adjusted without supplying additional fuel to the cylinder. In particular, by increasing the volatility of the fuel in the cylinder it is possible to enrich the air-fuel mixture near the spark plug. In this way, the methods of FIGS. 6-9 can improve the possibility of combustion in engine cylinders without increasing the possibility of increasing spark plug fouling and without the possibility of increasing the propensity for fuel to enter the engine crankcase.

Figure 1:
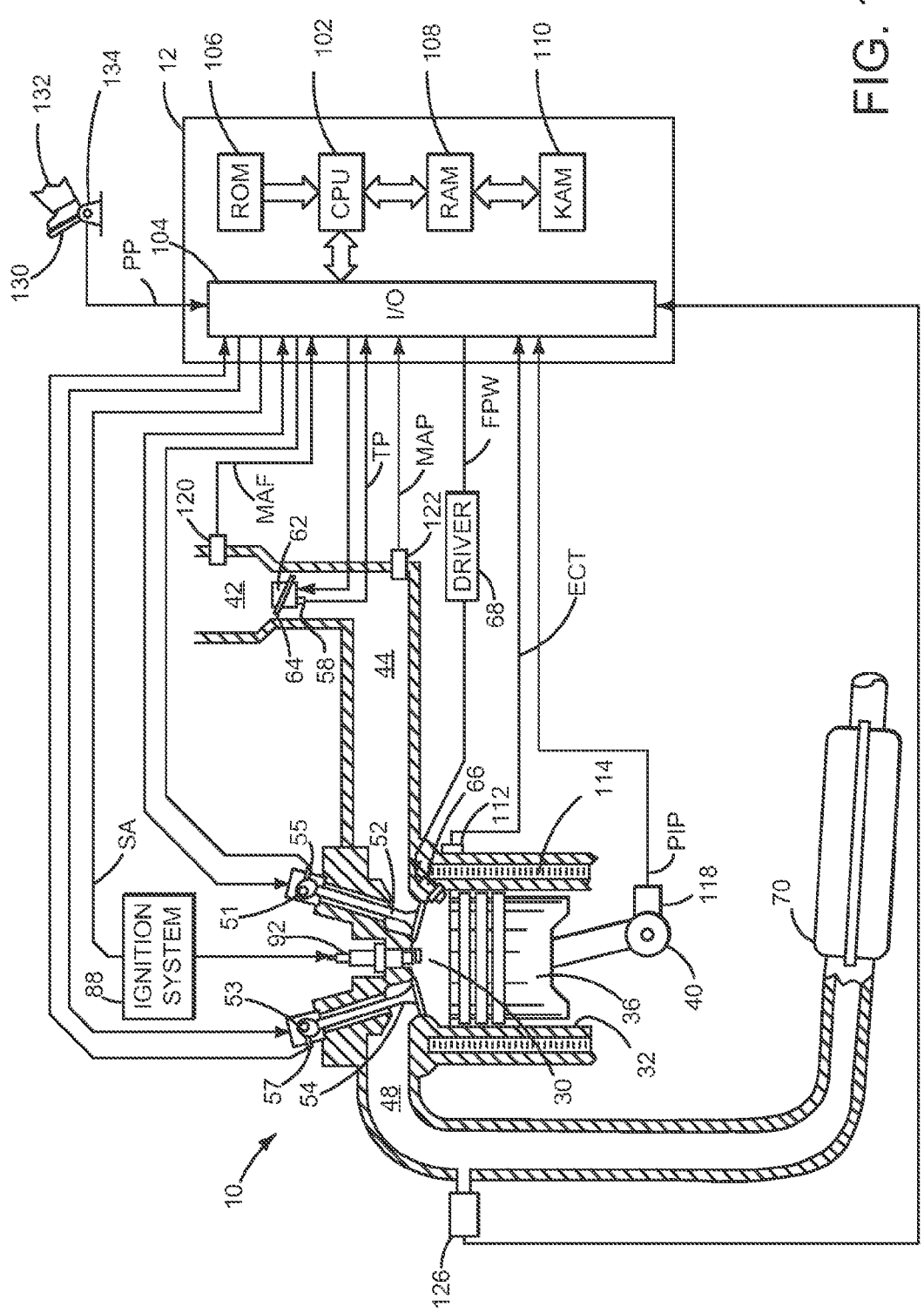
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly or other known variable valve actuator. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom-dead-center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top-dead-center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
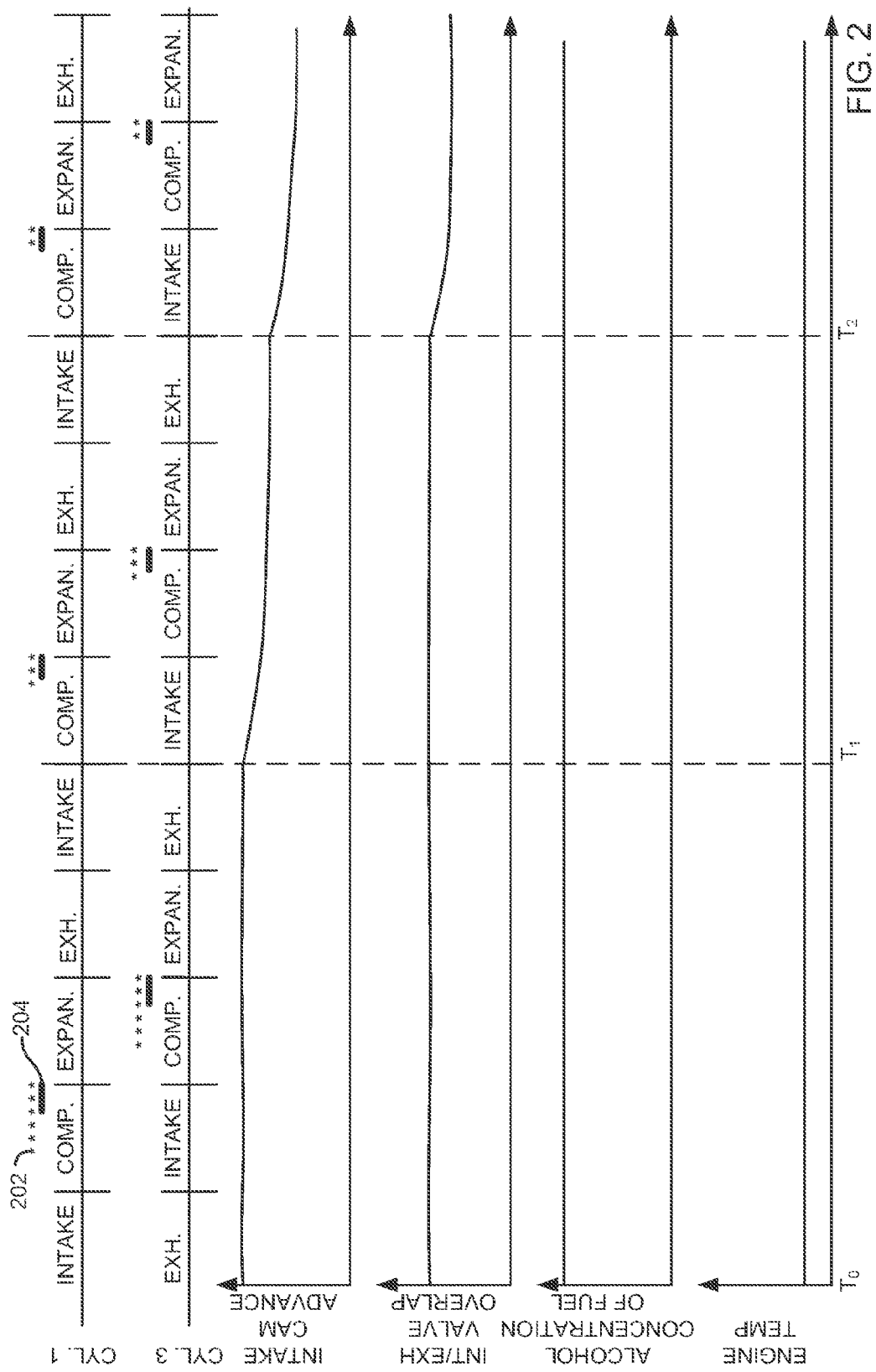
FIG. 2 is an example plot of signals of interest during a prophetic first engine starting sequence.

Referring now to FIG. 2, signals of interest during a first engine start are shown. FIG. 2 includes six plots of interest during an engine start. Strokes for cylinders number one and three of a four cylinder four cycle engine having a combustion order of 1-3-4-2 are shown. The engine is operating in a four cycle mode with intake and exhaust valves opening and closing according to the four cycle mode. The strokes of cylinder numbers four and two are similar to those of cylinders number one and three except the phase of cylinder numbers four and two are different. Therefore, for the sake of brevity, the strokes of cylinders number four and two are omitted.

It should also be mentioned that throughout the description a time since engine stop may be expressed as an amount of time the engine has been rotating since the engine was last stopped.

The first plot from the top of FIG. 2 shows cylinder strokes for cylinder number one. The various strokes of cylinder number one are identified with abbreviations. Intake stroke is denoted as INTAKE while compression stroke is shown as COMP. Further, the expansion and the exhaust strokes are also shown as EXPAN and EXH respectively. As the engine rotates, each cylinder periodically enters a new stroke. For example, cylinder number one moves from the intake stroke to the compression stroke after the engine begins to rotate.

The location and timing of spark for each cylinder is indicated by an asterisk (e.g., *). For example, asterisk 202 represents timing of a first spark in cylinder number one since time $T_0$. Where there are multiple asterisks, multiple sparks occur during a single cylinder cycle.

Fuel injection timing is indicated via a wide solid line above the individually identified cylinder strokes. For example, line 204 represents fuel injection timing for cylinder number one since time $T_0$. In this particular example, fuel is injected during the compression stroke and ends near TDC compression stroke.

The second plot from the top of FIG. 2 represents timing events for cylinder number three of the engine. Cylinder strokes, spark, and fuel injection are represented the same as in the first plot at the top of FIG. 2. The timing of events for cylinder number three are similar to those for cylinder number one; however, the cylinder strokes for cylinder number three are out of phase with the strokes of cylinder number one by 180 crankshaft degrees.

The third plot from the top of FIG. 2 shows an amount of intake valve cam advance. Intake valve opening advance increases in the direction of the Y axis arrow. The X axis represents time, and time increases from the left to right. In one example, the intake cam timing is configured such that advancing intake cam timing increases an amount of air trapped in a cylinder during a compression stroke. The greater the advance the more air that is trapped in the cylinder during a compression stroke. In one example, a cam is most advanced at a position that provides for an intake valve closing timing (IVC) shortly after BDC intake stroke (e.g., 20 crankshaft degrees after BDC). Closing the intake valve shortly after BDC provides a substantially maximum amount of air to the engine cylinder during a cycle of the cylinder.

In an alternative example, a cam is most retarded at a position that provides for an IVC shortly after BDC. Thus, at substantially maximum cam retard, the intake valve closes to trap a substantial maximum amount of air in the cylinder during a compression stroke of the cylinder. Consequently, in some systems cams may be advanced to increase cylinder air charge while in other systems cams may be retarded to increase cylinder air charge.

The fourth plot from the top of FIG. 2 represents an amount of intake valve and exhaust valve opening time overlap. Intake and exhaust valve opening time overlap increases in the direction of the Y axis arrow. The X axis represents time, and time increases from the left to the right. Thus, in one example, the number of crankshaft degrees that the intake valve and exhaust valve are simultaneously open increases in the direction of the Y axis arrow. By increasing the overlap time between open intake and open exhaust valves, it is possible to increase the amount of exhaust residuals trapped in the engine cylinder from previous combustion events. And, since combustion gases may be warmer than ambient air temperature, vaporization of fuel injected into the cylinder may be improved as an amount of exhaust gas residuals trapped in the cylinder increase, at least up to some concentration of exhaust gas residuals. It should be noted that after a few combustion events, the intake and exhaust valve overlap time may be decreased to improve combustion stability.

The fifth plot from the top of FIG. 2 represents a concentration of alcohol in fuel combusted by the engine. The concentration of alcohol in the fuel increases in the direction of the Y axis arrow. The X axis represents time, and time increases from the left to right. For example, if the fuel combusted by the engine is comprised of 100% alcohol, a level near the top of the fifth plot indicates 100% alcohol. On the other hand, if the fuel is comprised of 5% alcohol and 95% gasoline, a level near the bottom of the fifth plot indicates 5% alcohol.

The sixth plot from the top of FIG. 2 represents a temperature of the engine. The temperature of the engine may be a coolant temperature, cylinder head temperature, or other engine temperature. Engine temperature increases in the direction of the Y axis arrow. The X axis represents time, and time increases from the left to right.

In the example illustrated in FIG. 2, engine cranking starts at time $T_0$, and engine rotation continues to the right until the end of FIG. 2. No engine rotation is present before time $T_0$. Further, strokes for cylinders number one and three are shown as constant in duration because the cylinder strokes are relative to crankshaft position. On the other hand, the amount of time for each stroke varies according to speed of crankshaft rotation. Therefore, time for each plot is related to crankshaft position rather than simply increasing linearly as each second elapses. Vertical dashed lines represent times $T_1$ and $T_2$ with respect to the strokes of cylinders number one and three. In particular, time $T_1$ occurs at BDC of the second intake stroke of cylinder number one since engine stop. Time $T_2$ occurs at BDC of the third intake stroke of cylinder number one since engine stop.

At time $T_0$, the engine starts to rotate and a first spark is initiated in cylinder number one during the compression stroke of cylinder number one. The first spark is initiated before fuel is injected to cylinder number one during cranking. Further, the first spark is initiated during the first cycle of the compression stroke of cylinder number one. Five additional sparks are initiated after the first spark is initiated. Sparks may be initiated via a coil, or in other examples, an alternative ignition source such as a plasma ignition may be substituted. The last spark of cylinder number one occurs during the first cylinder cycle of cylinder number one near TDC compression stroke of cylinder number one.

The spark timing of FIG. 2 is exemplary in nature and not intended to limit the scope or breadth of the description. For example, in alternative examples, the first spark may be initiated earlier or later in the compression stroke. Further, in some examples, the first spark during the first cycle of cylinder number one since engine stop may be initiated during the intake stroke of cylinder number one.

The final spark of the plurality of sparks during the first cycle of cylinder number one since engine stop may occur before TDC compression stroke or after TDC compression stroke of cylinder number one. In addition, the final spark of the plurality of sparks during the first cycle of cylinder number one may occur after or before fuel injection is ceased during the first cycle of cylinder number one since engine stop. The specific number of sparks and the spark timing may be determined according to empirically determined data stored in memory of a controller such as is shown in FIG. 1. Additional details with respect to spark control are provided according to the methods of FIGS. 6-9.

Fuel injection for cylinder number one also begins during the compression stroke of the first cycle of cylinder number one since engine stop. In this example, fuel injection is started after the first spark is initiated at 202 and continues until TDC compression is reached. In alternative examples, fuel injection may begin and end earlier than is shown in FIG. 2. For example, fuel injection may begin at BDC intake stroke and end before TDC compression stroke. Further, in other examples, multiple injections of fuel may take place in cylinder number one during the first cylinder cycle of cylinder number one since engine stop. The specific amount of fuel and the time fuel is injected may be determined according to empirically determined data stored in memory of a controller such as is shown in FIG. 1. Additional details with respect to fuel delivery are provided according to the methods of FIGS. 6-9.

Spark and fuel delivery for cylinder number three during the first cycle of cylinder number three (e.g., from time $T_0$ to time $T_1$) are similar to the description for spark and fuel control during the first cycle of cylinder number one since engine stop.

Cam timing is shown in an advanced position to indicate that additional air can enter the engine cylinders during the intake strokes of the respective cylinders. By increasing the amount of air that may enter cylinders, the effective compression ratio of the cylinders is increased. However, is should be noted that the effective compression ratio may be increased via other actuators such as electrical valve timing adjustments or changes in valve lift, for example. The cam is advanced in response to the high level of alcohol concentration in the fuel as is shown in the fifth plot. Further, the cam advance can be adjusted in response to the relatively low engine temperature as is shown in the sixth plot from the top of FIG. 2. The cam may be set to an advanced position during an engine stop, or alternatively, before or during an engine start via an electrically actuated cam phasing device, for example.

A relatively long valve opening overlap duration between intake and exhaust valves is set in response to the high concentration of alcohol present in the fuel being combusted by the engine. In one example, the exhaust valve timing may be adjusted in response to IVO which is dictated by IVC, and IVC is adjusted to provide the desired effective engine compression ratio. Further, the intake and exhaust opening time overlap can be adjusted in response to the relatively low engine temperature as is shown in the sixth plot from the top of FIG. 2. Thus, during conditions where alcohol concentration in the fuel being combusted by the engine and where engine temperature is low, the effective compression ratio as well as the intake and exhaust valve opening overlap duration can be increased with an increased amount of alcohol present in the fuel.

At time $T_1$, one combustion event has occurred in each cylinder in response to injecting fuel and providing a spark in each cylinder. Since combustion heats the cylinder, evaporation of the fuel in the cylinder can also increase. Therefore, the number of sparks in the cylinder may be adjusted in response to engine events. In this example, the number of sparks is reduced from six to three. In addition, the first spark occurs at a different timing than the first spark of cylinder number one during the first cylinder cycle. Thus, the spark timing and number of sparks during a cylinder cycle may be varied according to the number of combustion events, alcohol concentration of fuel combusted by the engine, cylinder strokes, or cylinder cycles from engine stop. In other examples, the intake cam advance may be held for additional or fewer cylinder strokes, combustion cycles, or combustion events.

The intake cam begins to be retarded at time $T_1$ in response to a number of engine events so that the effective compression ratio of the engine is reduced. In this example, the duration of intake and exhaust valve overlap for cylinders number one and two remains constant during the second cylinder cycle. In other examples, the duration of the intake and exhaust valve overlap may be decreased as the number of combustion events, cylinder strokes, or cylinder cycles increases. By decreasing the duration that the intake valve and exhaust valve are simultaneously open, the amount of residual exhaust gas trapped in the cylinder during combustion can be decreased.

Fuel injection timing is shown to be similar between time $T_0$ and time $T_1$. However, in alternate examples, the timing of fuel injection may also be adjusted in response to concentration of alcohol in the fuel; number of combustion events, cylinder cycles, or number of cylinder strokes since engine stop; and engine temperature.

At time $T_2$, two combustion events have occurred in each cylinder in response to injecting fuel and providing a spark in each cylinder. The number of sparks provided to the cylinder is also adjusted down to two. The first spark in cylinder number one during the third cylinder cycle occurs at a different timing than the first spark of cylinder number one during the second cylinder cycle.

The intake cam is further retarded at time $T_2$ in response to a number of engine events so that the effective compression ratio of the engine is reduced again. The duration of intake and exhaust valve open time overlap is also reduced at $T_2$ so that the amount of residual exhaust gas trapped in the cylinder is decreased. As the cylinder temperature increases, less exhaust heat may be required to vaporize fuel in the cylinder. And, reducing the intake and exhaust valve opening duration overlap can improve combustion stability.

After a predetermined number of combustion events, cylinder cycles, or cylinder strokes, the intake and exhaust valve overlap arrives at a duration that is related to engine speed, engine load, and engine temperature. Thus, after some predetermined number of combustion events, cylinder cycles, or cylinder strokes, cams are no longer adjusted in response to combustion events, cylinder cycles, or cylinder strokes.

Fuel injection timing is shown to be similar between time $T_1$ and time $T_2$. However, as mentioned above, the timing of fuel injection may also be adjusted in response to concentration of alcohol in the fuel; number of combustion events, cylinder cycles, or number of cylinder strokes since engine stop; and engine temperature.

Figure 3:
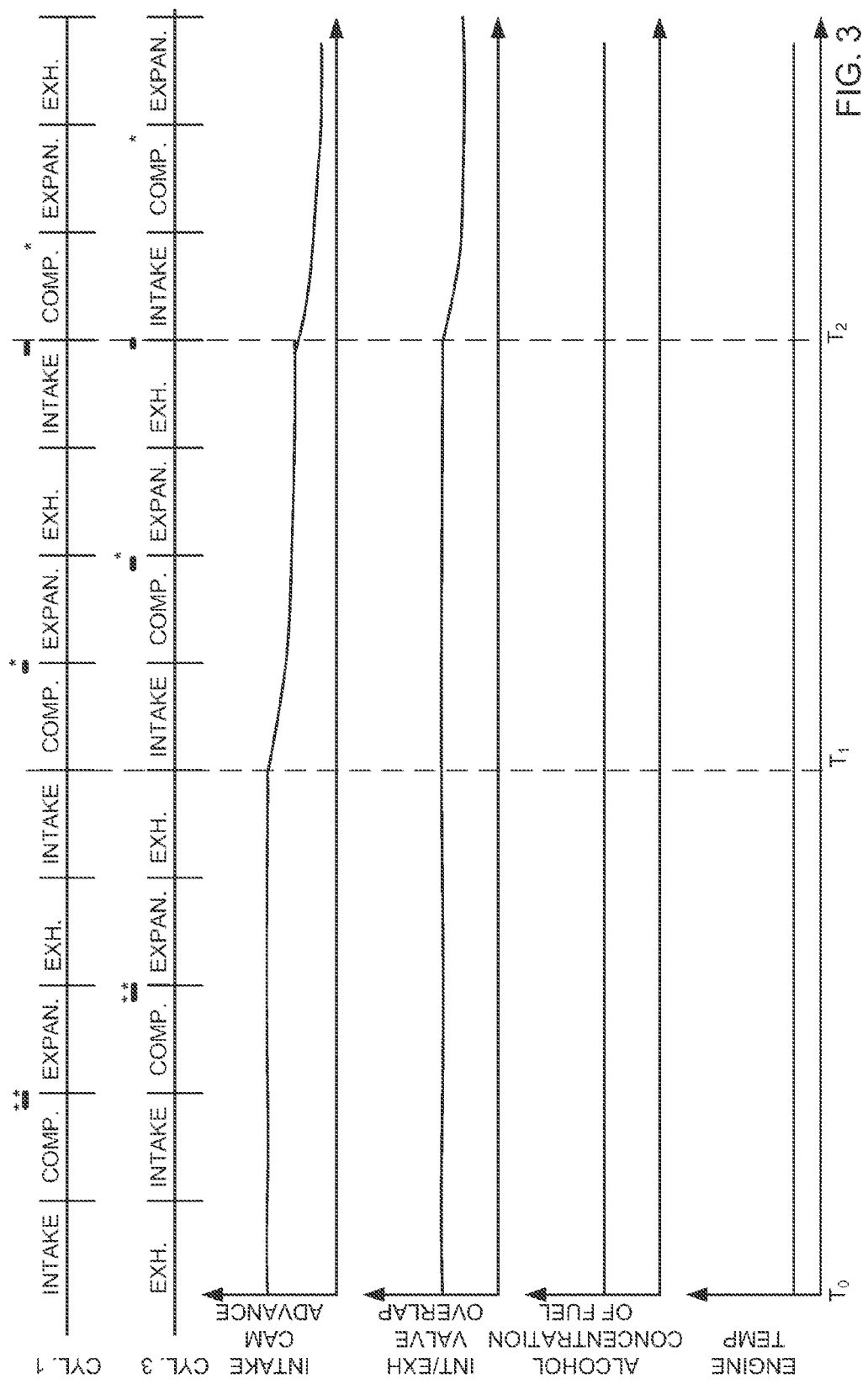
FIG. 3 is an example plot of signals of interest during a prophetic second engine starting sequence.
Figure 4:
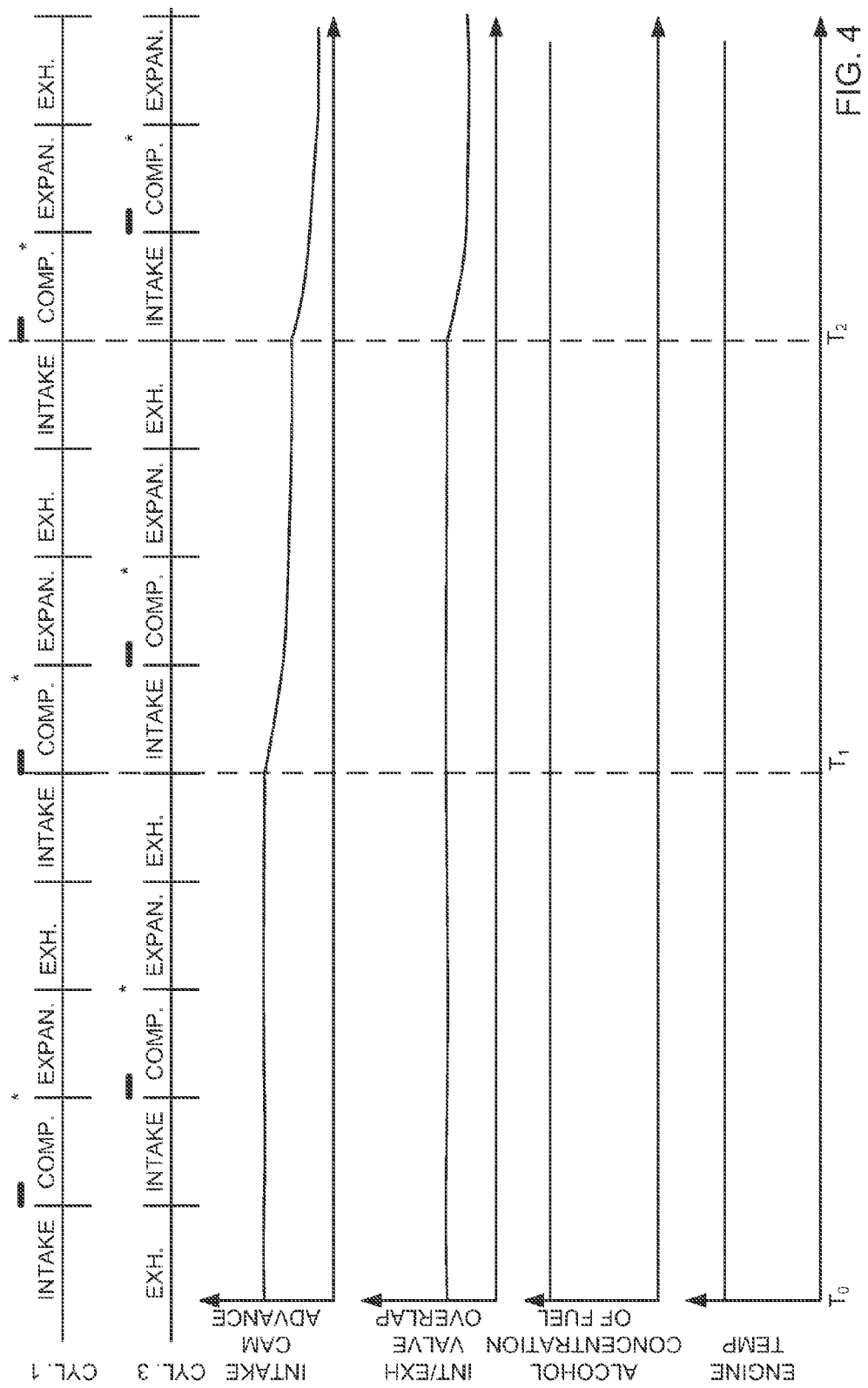
FIG. 4 is an example plot of signals of interest during a prophetic third engine starting sequence.
Figure 5:
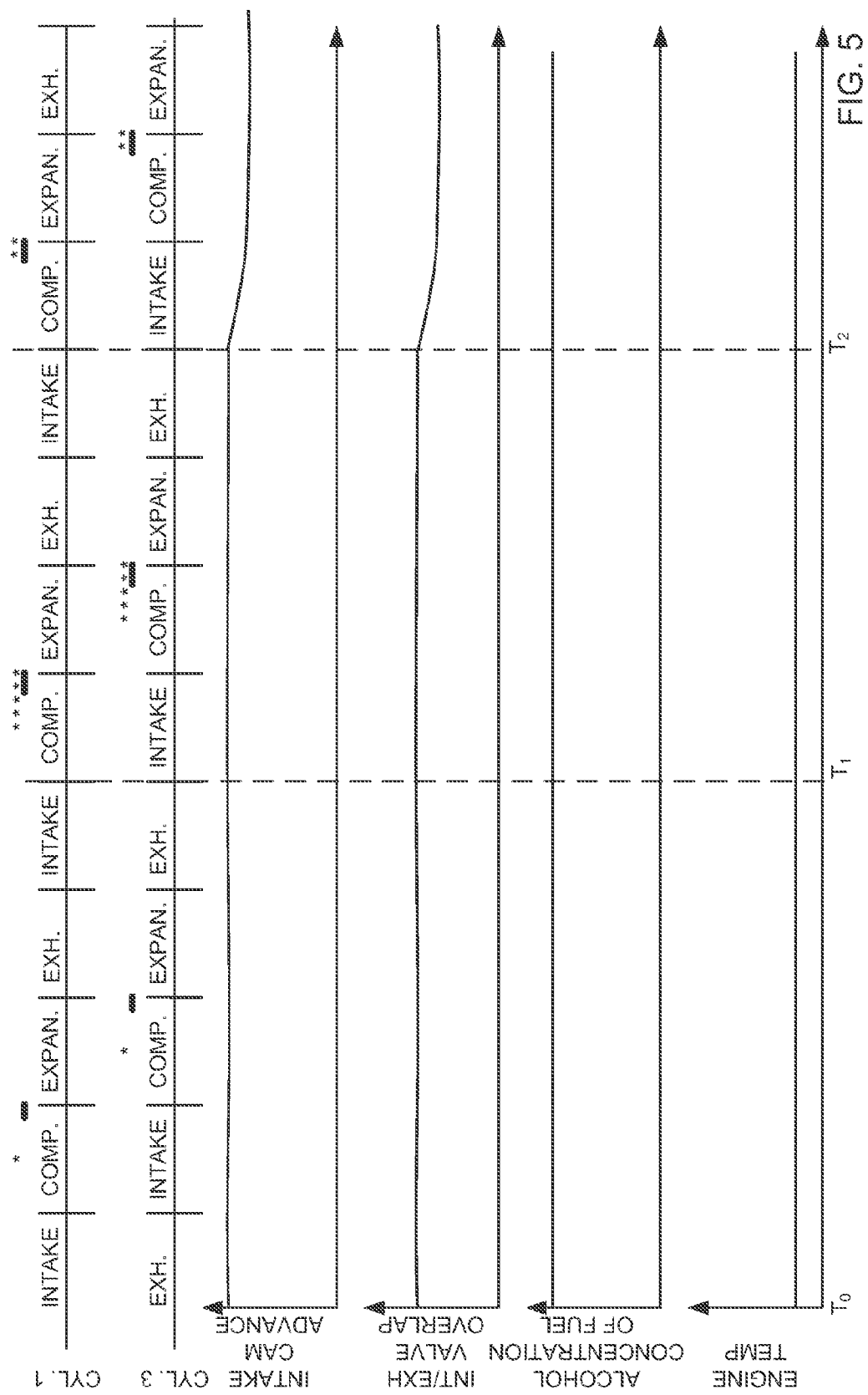
FIG. 5 is an example plot of signals of interest during a prophetic fourth engine starting sequence.

Some signals of FIGS. 3-5 are similar to the signals of FIG. 2. Therefore, for the sake of brevity, the description of similar signals shown in FIGS. 3-5 is omitted. Instead, the differences in signals and timing will be described in detail.

Referring now to FIG. 3, an example plot of signals of interest during a prophetic second engine starting sequence is shown. In particular, signals of interest for an engine start where fuel having a lower concentration of alcohol as compared to the alcohol concentration in FIG. 2 is shown. The engine is operating in a four cycle mode with intake and exhaust valves opening and closing according to the four cycle mode.

At time $T_0$, the engine starts to rotate and a first spark is initiated in cylinder number one during the compression stroke of cylinder number one. The first spark is initiated near the time fuel is injected to cylinder number one during cranking. Further, the first spark is initiated during the first cycle of the compression stroke of cylinder number one. One additional spark is initiated after the first spark. The last spark of cylinder number one during the first cylinder cycle of cylinder number one occurs near TDC compression stroke of cylinder number one. The spark timing of FIG. 3 is exemplary in nature and not intended to limit the scope or breadth of the description. For example, in alternative examples, the first spark may be initiated earlier or later in the compression stroke. In addition, in some examples, the first spark during the first cycle of cylinder number one since engine stop may be initiated during the intake stroke of cylinder number one. Further, the final spark of the plurality of sparks during the first cycle of cylinder number one since engine stop may occur before TDC compression stroke or after TDC compression stroke of cylinder number one. Further still, the final spark of the plurality of sparks during the first cycle of cylinder number one may occur after or before fuel injection is ceased during the first cycle of cylinder number one since engine stop. The specific number of sparks and the spark timing may be determined according to empirically determined data stored in memory of a controller such as is shown in FIG. 1. In this example, the number of sparks during a cycle of a cylinder is reduced as compared to the number of sparks provided to the cylinder in FIG. 2. The number of sparks provided to the cylinder is adjusted in response to a lower concentration of alcohol in the fuel being combusted since fuel volatility may increase as the concentration of alcohol in the fuel decreases.

Fuel injection for cylinder number one also begins during the compression stroke of the first cycle of cylinder number one since engine stop. In this example, fuel injection is started after the first spark is initiated and continues until TDC compression is reached. In alternative examples, fuel injection may begin and end earlier than is shown in FIG. 3. In addition, in other examples, multiple injections of fuel may take place in cylinder number one during the first cylinder cycle of cylinder number one since engine stop. The specific amount of fuel and the time fuel is injected may be determined according to empirically determined data stored in memory of a controller such as is shown in FIG. 1.

Spark and fuel delivery for cylinder number three during the first cycle of cylinder number three (e.g., from time $T_0$ to time $T_1$) are similar to the description for spark and fuel control during the first cycle of cylinder number one since engine stop.

Cam timing is shown in an advanced position to indicate that additional air can enter the engine cylinders during the intake strokes of the respective cylinders. However, it should be noted that cam timing in FIG. 3 is less advanced than cam timing shown in FIG. 2 because a lower concentration of alcohol is present in the fuel provided to the engine. Further, the cam advance can be adjusted in response to the relatively low engine temperature as is shown in the sixth plot from the top of FIG. 3. The cam may be set to an advanced position during an engine stop, or alternatively, during an engine stop via an electrically actuated cam phasing device, for example.

The valve opening overlap duration between intake and exhaust valves is set to a middle level in response to the medium concentration of alcohol present in the fuel being combusted by the engine and the low engine temperature. However, as the concentration of alcohol present in the fuel being combusted decreases, the valve opening time overlap amount can be decreased. Further, the intake and exhaust overlap can be adjusted in response to the relatively low engine temperature as is shown in the sixth plot from the top of FIG. 3.

At time $T_1$, one combustion event has occurred in each cylinder in response to injecting fuel and providing a spark in each cylinder. Consequently, the number of sparks provided to the cylinder is adjusted in response to a number of engine events. In this example, the number of sparks is reduced from two to one. Thus, the spark timing and number of sparks may be varied according to the number of combustion events, concentration of alcohol in the fuel delivered to the engine, cylinder strokes, or cylinder cycles from engine stop. In other examples, the intake cam advance may be held for additional or fewer cylinder strokes, combustion cycles, or combustion events.

The intake cam begins to be retarded at time $T_1$ in response to a number of engine events so that the effective compression ratio of the engine is reduced. In this example, the duration of intake and exhaust valve opening time overlap for cylinders number one and two remains constant during the second cylinder cycle. In other examples, the duration of the intake and exhaust valve overlap may be decreased as the number of combustion events, cylinder strokes, or cylinder cycles increases. Fuel injection timing is shown to be similar between time $T_0$ and time $T_1$.

However, in alternate examples, the timing of fuel injection may also be adjusted in response to concentration of alcohol in the fuel; number of combustion events, cylinder cycles, or number of cylinder strokes since engine stop; and engine temperature.

At time $T_2$, two combustion events have occurred in each cylinder in response to injecting fuel and providing a spark in each cylinder. The number of sparks provided to the cylinder is also adjusted down to one and fuel is injected during the intake stroke rather than during the compression stroke. The fuel injection timing may be adjusted in response to a number of combustion events since engine stop, a number of cylinder cycles since engine stop, or a number of cylinder strokes since engine stop.

The intake cam is further retarded at time $T_2$ in response to a number of engine events so that the effective compression ratio of the engine is reduced again. The duration of intake and exhaust valve open time overlap is also reduced at $T_2$ so that the amount of residual exhaust gas trapped in the cylinder is decreased.

After a predetermined number of combustion events, cylinder cycles, or cylinder strokes, the intake and exhaust valve opening time overlap arrives at a duration that is related to engine speed, engine load, and engine temperature. Thus, after some predetermined number of combustion events, cylinder cycles, or cylinder strokes cams are no longer adjusted in response to combustion events, cylinder cycles, or cylinder strokes.

Referring now to FIG. 4, an example plot of signals of interest during a prophetic third engine starting sequence is shown. In particular, signals of interest for an engine start where engine temperature is higher and where fuel having a higher concentration of alcohol is combusted by the engine is shown. The engine is operating in a four cycle mode with intake and exhaust valves opening and closing according to the four cycle mode.

At time $T_0$, the engine starts to rotate and fuel is injected early in the compression 20 stroke before a first spark is initiated in cylinder number one during the compression stroke of cylinder number one. In alternative examples, fuel may be injected during the intake stroke or later in the compression stroke of cylinder number one. Further, the first spark is initiated during the first cycle of the compression stroke of cylinder number one. In this example, a single spark is provided to each cylinder during each cylinder cycle. The spark timing of FIG. 4 is exemplary in nature and not intended to limit the scope or breadth of the description. For example, in alternative examples, the spark may be initiated earlier or later in the compression stroke.

Fuel injection for cylinder number one begins before a first spark and during the compression stroke of the first cycle of cylinder number one since engine stop. In this example, fuel injection is started near BDC compression stroke. In alternative examples, fuel injection may begin before or during the intake stroke or later in the compression stroke as compared to timing shown in FIG. 3. In addition, in other examples, multiple injections of fuel may take place in cylinder number one during the first cylinder cycle of cylinder number one since engine stop. The specific amount of fuel and the time fuel is injected may be determined according to empirically determined data stored in memory of a controller such as is shown in FIG. 1.

Spark and fuel delivery for cylinder number three during the first cycle of cylinder number three (e.g., from time $T_0$ to time $T_1$) are similar to the description for spark and fuel control during the first cycle of cylinder number one since engine stop.

Cam timing is shown in an advanced position, but where less advance is present than is shown in FIG. 2. The cam advance indicates that additional air can enter the engine cylinders during the intake strokes of the respective cylinders. However, it should be noted that cam timing in FIG. 4 is less advanced than cam timing shown in FIG. 2 because the engine temperature is higher, thereby providing improved conditions for fuel vaporization. The cam may be set to an advanced position during an engine stop, or alternatively, during an engine stop via an electrically actuated cam phasing device, for example.

The valve opening overlap duration between intake and exhaust valves is set to a medium duration in response to the high concentration of alcohol present in the fuel being combusted by the engine and warm engine temperature. However, as the concentration of alcohol present in the fuel being combusted decreases, the valve opening overlap amount can be decreased.

At time $T_1$, one combustion event has occurred in each cylinder in response to injecting fuel and providing a spark in each cylinder. Consequently, the intake cam begins to be retarded at time $T_1$ in response to a number of engine events so that the effective compression ratio of the engine is reduced. In this example, the duration of intake and exhaust valve overlap for cylinders number one and two remains constant during the second cylinder cycle. In other examples, the duration of the intake and exhaust valve overlap may be decreased as the number of combustion events, cylinder strokes, or cylinder cycles increases.

Fuel injection timing is shown to be similar between time $T_0$ and time $T_1$. However, in alternate examples, the timing of fuel injection may also be adjusted in response to concentration of alcohol in the fuel; number of combustion events, cylinder cycles, or number of cylinder strokes since engine stop; and engine temperature.

At time $T_2$, two combustion events have occurred in each cylinder in response to injecting fuel and providing a spark in each cylinder. The fuel injection timing may be adjusted in response to a number of combustion events since engine stop, a number of cylinder cycles since engine stop, concentration of alcohol in fuel supplied to the engine, or a number of cylinder strokes since engine stop.

The intake cam is further retarded at time $T_2$ so that the effective compression ratio of the engine is reduced again. The duration of intake and exhaust valve opening time overlap is also reduced at $T_2$ so that the amount of residual exhaust gas trapped in the cylinder is decreased.

After a predetermined number of combustion events, cylinder cycles, or cylinder strokes, the intake and exhaust valve overlap arrives at a duration that is related to engine speed, engine load, and engine temperature. Thus, after some predetermined number of combustion events, cylinder cycles, or cylinder strokes, cams are no longer adjusted in response to combustion events, cylinder cycles, or cylinder strokes.

Referring now to FIG. 5, an example plot of signals of interest during a prophetic fourth engine starting sequence is shown. In particular, signals of interest for an engine start where engine temperature is lower and where fuel having a higher concentration of alcohol is combusted by the engine is shown. The engine is operating in a four cycle mode with intake and exhaust valves opening and closing according to the four cycle mode.

At time $T_0$, the engine starts to rotate and spark is initiated in the compression stroke of cylinder number one before fuel is injected later in the compression stroke. No additional sparks are provided to the cylinder during the first cylinder cycle to ignite the air-fuel mixture in the engine. And, in some examples no spark is provided during the first cylinder cycle since engine stop. Instead, fuel is injected without providing spark during the cylinder cycle. However, the initial spark may act to increase temperature in the cylinder, and compressing the fuel and air mixture may act to increase the temperature of gases in the cylinder. Since no attempt is made to combust the first mixture, a misfire may not be observed by the operator.

Spark may be provided during the first cylinder cycle at a time where fuel in the cylinder has a low possibility of combusting. In addition, multiple sparks may be provided to the cylinder during some examples. Thus, the temperature of cylinder number one may be increased in this way prior to initiating combustion in cylinder number one during the second cycle of cylinder number one. Further, by compressing the air-fuel mixture during the first cycle of cylinder number one since engine stop, a fraction of vaporized fuel may remain in the cylinder during subsequent cylinder cycles to reduce the possibility of misfire during cylinder cycles where combustion of an air-fuel mixture is desired. It should be noted that fuel may be injected several times during the first cycle of cylinder number one. Further, spark timing may be adjusted earlier or later than is show as long as spark is not provided to combust an air-fuel mixture during the first cycle of cylinder number one.

Spark and fuel delivery for cylinder number three during the first cycle of cylinder number three (e.g., from time $T_0$ to time $T_1$) are similar to the description for spark and fuel control during the first cycle of cylinder number one since engine stop.

Cam timing is shown in an advanced position similar to that shown in FIG. 2. The cam advance indicates that additional air can enter the engine cylinders during the intake strokes of the respective cylinders. The cam may be set to an advanced position during an engine stop, or alternatively, during an engine stop via an electrically actuated cam phasing device, for example.

The valve opening overlap duration between intake and exhaust valves is set to a relatively long duration in response to the higher concentration of alcohol present in the fuel being combusted by the engine at a lower engine temperature. The valve opening overlap can be decreased as a concentration of alcohol present in the fuel being combusted decreases.

At time $T_1$, cylinder number one enters the compression phase of a second cylinder cycle since engine stop. No combustion has occurred since engine stop and the engine is rotating under the power of a motor or starter up until time $T_1$. Approximately half way through the second compression stroke of cylinder number one, multiple sparks are provided to cylinder number one. The first spark is provided before fuel is injected during the second cylinder cycle of cylinder number one. In this example, a total of five sparks are provided during the second cycle of cylinder number one since engine stop. However, fewer or additional sparks may be provided during the second cylinder cycle of cylinder number one. The number of sparks and spark timing may be related to engine temperature and the concentration of alcohol present in the fuel being combusted by the engine.

Fuel injection timing is shown to be similar between time $T_0$ and time $T_1$. However, in alternate examples, the timing of fuel injection may also be adjusted in response to concentration of alcohol in the fuel; number of combustion events, cylinder cycles, or number of cylinder strokes since engine stop; and engine temperature. Since fuel is injected in the presence of spark combustion can be initiated during the second cycle of cylinder number one. It has been determined that injecting fuel to a cylinder and delaying combustion in the cylinder until a subsequent cycle of the cylinder can reduce the possibility of misfire within the cylinder. Thus, fuel is injected to each cylinder during a cycle of the cylinders, but combustion within the cylinder is delayed until a subsequent cylinder cycle. A reduction in engine misfire may be desirable to improve a driver's perception of engine starting.

At time $T_2$, one combustion events has occurred in each cylinder of the engine in response to injecting fuel and providing a spark in each cylinder during the second cylinder cycle since engine stop. The fuel injection timing may be adjusted in response to a number of combustion events since engine stop, a number of cylinder cycles since engine stop, or a number of cylinder strokes since engine stop. Further, as shown in this example, the number of sparks may be reduced in response to a number of combustion events since engine stop, a number of cylinder cycles since engine stop, or a number of cylinder strokes since engine stop.

The intake cam begins to be retarded at time $T_2$ so that the effective compression ratio of the engine is reduced. The duration of intake and exhaust valve opening time overlap is also reduced at $T_2$ so that the amount of residual exhaust gas trapped in the cylinder is decreased. Thus, in this example, fuel is injected during a first cycle of cylinder number one since engine stop without combusting the fuel during the first cycle of cylinder number one. In the second cycle of cylinder number one, a plurality of sparks are provided to cylinder number one to ignite fuel injected to cylinder one during the second cycle of cylinder number one since engine stop. The first spark of the plurality of sparks may be initiated before fuel is injected to cylinder number one during the second cycle of cylinder number one to heat the contents of the cylinder. Additional sparks may be provided during the second cycle of cylinder number one to combust an air-fuel mixture in cylinder number one. The effective compression ratio and amount of exhaust residuals of the engine may be reduced in response to a number of combustion events in a cylinder, a number of cylinder cycles, or a number of cylinder strokes.

It should be noted that the sequences illustrated in FIGS. 2-6 apply to cylinders of an engine other than those illustrated as well. For example, combustion may be first initiated in cylinder number three rather than cylinder number one of the illustrated engine. And, spark timing and fuel timing for each cylinder of the engine can be controlled in the same manner from cylinder cycle to cylinder cycle. For example, spark and fuel for cylinders 1-4 of a four cylinder engine may be controlled identically in each cylinder during each cylinder cycle. Of course, spark timing and fuel timing are adjusted to account for the cylinders having different strokes during at a specific time in an engine cycle. Further, engine cylinders may begin from alternative positions than those illustrated without departing from the scope of breadth of the description. The illustrated starting sequences may be applied to engine having additional or fewer cylinders than four cylinders. In other examples, spark timing and fuel timing may be adjusted for each cylinder based on a number of combustion events or other event in with respect to engine operation so that the engine compression ratio, spark timing, and fuel timing are adjusted more often than every cylinder or engine cycle. For example, compression ratio, spark timing, and fuel timing can be adjusted every combustion event so that adjustments are made twice every engine revolution.

Methods 6-9 are executable as instructions in a controller such as controller 12 of FIG. 1. Further, methods 6-9 may be applied to a variety of engines without departing from the breadth or scope of this disclosure.

Referring now to FIG. 6, a high level flowchart for starting an engine is shown. At 602, method 600 determines operating conditions. In one example, operating conditions may include but are not limited to engine temperature, concentration of alcohol in fuel supplied to the engine, cam position, torque demand, and engine speed. Operating conditions may be determined via monitoring the states of sensors and/or actuators. Method 600 proceeds to 604 after operating conditions are determined.

At 604, method 600 judges whether or not to adjust an engine compression ratio in response to a concentration of alcohol in fuel and engine temperature. In one example, base cam timing may be configured for 90% gasoline mixture so that the engine has an effective compression ratio of less than 10:1 during starting. However, if it is determined that a gasoline concentration of less than 90% is present in fuel combusted by the engine, the compression ratio may be increased. In alternative examples, the engine compression ratio may be decreased in response to a fuel combusted by the engine having less than 90% alcohol concentration within the fuel. Further, if engine temperature is less than a threshold temperature, it may be judged desirable to increase the engine compression ratio. In one example, the threshold temperature may be 20° C. If method 600 judges to adjust the engine compression ratio, method 600 proceeds to 606. Otherwise, method 600 proceeds to 608.

At 606, method 600 adjusts engine compression ratio. In one example, method 600 adjusts the engine compression ratio via cam timing according to the method of FIG. 7. In alternative examples, the effective compression ratio may be adjusted via valve lift or electrically actuated valves. Thus, the engine compression ratio may be adjusted in a variety of ways. Method 600 proceeds to 608 after the engine compression ratio is adjusted.

At 608, method 600 judges whether or not to adjust the cylinder cycle start of spark in response to an alcohol concentration of fuel combusted by the engine. In one example, if a concentration of alcohol in a fuel combusted by the engine is greater than a predetermined amount, the cylinder cycle start of spark is adjusted. Further, in some examples, the cylinder cycle start of spark may be adjusted for engine temperature. If method 600 judges to adjust start of spark timing method 600 proceeds to 610. Otherwise, method 600 proceeds to 612.

At 610, method 600 adjusts cylinder cycle start of spark. In one example, method 600 adjusts the cylinder cycle start of spark according to the method of FIG. 8. The cylinder cycle start of spark is a cycle of a cylinder where spark is first provided since an engine stop. For example, an engine may be rotated for two engine cycles after engine stop before spark is supplied in a third engine cycle to start the engine. Thus, the cylinder cycle start of spark is during the third engine cycle. Method 600 proceeds to 612 after the cylinder cycle start of spark is adjusted.

At 612, method 600 judges whether or not to adjust spark timing and number of sparks provided to a cylinder during a single cylinder cycle in response to a concentration of alcohol present in a fuel combusted by the engine as well as a temperature of the engine. In one example, method 600 judges to adjust spark timing and a number of sparks provided to a cylinder during a single cylinder cycle at engine starting in response to an alcohol concentration of a fuel combusted by an engine being greater than a predetermined amount. For example, if an amount of alcohol in a fuel mixture exceeds 10%, spark timing and a number of sparks provided to a cylinder during engine starting may be adjusted. Similarly, if a temperature of the engine is less than a predetermined temperature, spark timing and a number of sparks provided to a cylinder during engine starting may be adjusted. If method 600 judges that it is desirable to adjust spark timing and number of sparks, method 600 proceeds to 614. Otherwise, method 600 exits.

At 614, method 600 adjusts spark timing and a number of sparks provided to an engine cylinder during engine starting. In one example, method 600 adjusts spark timing and a number of sparks provided to an engine cylinder during starting according to the method of FIG. 9. In addition, the number of sparks provided to an engine cylinder during cranking increases as the concentration of alcohol in a fuel increases and as a temperature of the engine decreases. Further, spark timing can be advanced to a crankshaft angle before where fuel is injected to the cylinder so that the contents of the cylinder can be heated without combusting an air-fuel mixture. Method 600 proceeds to exit after spark timing has been adjusted.

Referring now to FIG. 7, a method for adjusting a compression ratio of an engine for starting is shown. At 702, method 700 counts engine events since engine stop. In one example, method 700 counts a number of combustion events in a cylinder since the engine was stopped. In other words, method 700 can count a number of combustion events for a cylinder after an engine begins to rotate after the engine was stopped and no engine rotation was present. In other examples, engine events may include but are not limited to a number of cylinder strokes of a cylinder, a number of fuel injections, a number of sparks, a number of engine cycles, and a number of cylinder cycles. Each time a new engine event occurs the event counter is incremented. Method 700 proceeds to 704 after the event counter is updated.

At 704, method 700 adjusts the effective compression ratio of the engine. The effective compression ratio may be adjusted by changing the amount of air that can be trapped in a cylinder during a compression stroke. In one example, the effective compression ratio of the engine can be adjusted by varying the IVC position. In some engines, advancing IVC increases an engine's effective compression ratio. In other engines, retarding IVC increases an engine's effective compression ratio. Therefore, IVC is advanced in some applications while IVC is retarded in other applications to increase an engine's effective compression ratio. In other applications, an engine's effective compression ratio may be increased by increasing an amount of valve lift. In still other applications, an engine's effective compression ratio may be increased by increasing valve lift and adjusting IVC.

Method 700 adjusts IVC and/or valve lift for an engine start via sensing a concentration of alcohol in a fuel delivered to the engine. The alcohol may be sensed during a previous engine operation or from a sensor in a fuel tank, for example. An amount of alcohol in engine fuel may be determined via an oxygen sensor positioned in the engine exhaust system or via a sensor in a fuel line or tank. The concentration of alcohol present in the fuel may be used to index a table that outputs cam positions where to in response to alcohol concentration. For example, if fuel having an alcohol concentration of 50% is present and engine temperature is 22° C., the cam may be advanced by 10 crankshaft degrees from base cam timing according to the table. However, if the fuel has an alcohol concentration of 90% and engine temperature is 22° C., the cam may be advanced by 25 crankshaft degrees from base cam timing according to the table.

The camshaft advance timing may also be similarly adjusted for engine temperature, ambient temperature, and number of events since engine stop. For example, if the fuel has an alcohol concentration of 90% and engine temperature is 5° C., the cam may be advanced by 35 crankshaft degrees. By advancing the cam timing the effective compression ratio of the engine may be increased from 10:1 to 12:1, for example. In another example, cam timing may be advanced 20 crankshaft degrees in anticipation of an engine start. The cam timing may be advanced before or during engine rotation. Once the engine event counter at 702 begins updating the engine event counter, the cam and IVC timing is adjusted in response to the number of counted engine events. For example, the cam may be retarded 5 crankshaft degrees for every 10 counted engine events. A similar procedure may be implemented for adjusting valve lift.

In this way, the effective compression ratio of an engine or cylinder may be adjusted to account for varying concentrations of alcohol in fuel supplied to the engine as well as engine temperature, and ambient air temperature. Counting a number of engine events may be superior to counting time since engine stop since a number of engine events can vary with time and since cylinder warming may be more readily correlated to a number of engine events. In an alternative approach, an effective compression ratio may be adjusted in response to a number of engine events and a time since engine stop. Method 700 proceeds to 706 after adjusting the engine's effective compression ratio.

At 706, method 700 adjusts exhaust gas residual content for engine cylinders for an engine start. After a combustion event, products of combustion (e.g., $CO_2$ and $H_2O$) cylinder may be held in a cylinder via adjusting valve timing or introducing the combustion products through the intake valve via the exhaust. Combustion products are often at a higher temperature than is ambient air entering a cylinder. Therefore, temperature in the cylinder can be increased by retaining at least a portion of exhaust gases from a previous engine cycle during the present engine cycle. Increasing the cylinder temperature can improve vaporization of fuels in the cylinder. Therefore, the amount of exhaust gas residuals can be adjusted in response to the amount of alcohol present in the fuel provided to the engine, the ambient temperature, engine temperature, and number of engine events since engine stop to improve fuel vaporization.

In some examples, intake valve opening timing is of a constant duration. Therefore, an amount of intake and exhaust valve opening time overlap may vary when IVC is adjusted and exhaust valve closing (EVC) is stationary. One way to adjust intake and exhaust valve overlap while at the same time IVC is adjusted is to adjust EVC. Accordingly, EVC is adjusted via adjusting timing of the exhaust cam. In one example, an exhaust gas residual fraction for engine starting may be empirically determined and stored in a table that is indexed via an alcohol concentration of fuel supplied to the engine, engine temperature, ambient air temperature, and number of engine events since engine stop. Further, the exhaust cam position that provides the desired amount of exhaust gas residual is stored in a table and output when indexed via intake valve opening time (IVO), engine speed, and engine load. Thus, the exhaust cam position is adjusted in response to an amount of alcohol in the fuel delivered to the engine, number of engine events since engine stop, ambient air temperature, engine temperature, and IVC. Method 700 proceeds to 708 after the amount of exhaust gas residuals are adjusted.

At 708, method 700 adjusts the engine effective compression ratio and the amount of exhaust gas residuals trapped in the engine cylinder during a compression stroke via adjusting cam timing and/or valve lift. The intake and exhaust cam timings may be adjusted via an electrical or hydraulic cam phase adjustment mechanism. Intake valve lift may be adjusted via switching cam profiles. Method 700 exits after engine compression ratio and exhaust gas residuals for a cylinder during a specific cylinder cycle are adjusted.

Referring now to FIG. 8, a flowchart for delaying combustion to improve engine starting is shown. At 802, method 800 determines a number of cylinder cycles to delay initial spark supplied to engine cylinders since time of engine stop. In one example, a table holding a number of cylinder cycles to delay spark delivered to an engine cylinder is indexed via an alcohol concentration in a fuel delivered to the engine, engine temperature, and ambient temperature. In response to alcohol concentration, engine temperature, and ambient temperature the table outputs a number of cylinder cycles to delay spark supplied to one or more engine cylinders.

Similarly, a table holding a number of cylinder cycles to delay fuel injection to an engine cylinder may be indexed via an alcohol concentration in a fuel delivered to the engine, engine temperature, and ambient temperature. In response to alcohol concentration, engine temperature, and ambient temperature the table outputs a number of cylinder cycles to delay fuel injection supplied to one or more engine cylinders. Thus, the cylinder cycle during which a first spark since engine stop is delivered can be independent of the cylinder cycle during which a first fuel injection since engine stop occurs. Therefore, it is possible to fuel a cylinder without spark during a first cylinder cycle and then supply fuel and spark during a subsequent cylinder cycle. Alternatively, it is possible to provide spark to a cylinder without fueling the cylinder during a first cylinder cycle and to provide spark and fuel to the cylinder during a subsequent cylinder cycle.

In some examples, the first spark delivered since engine stop may be used to heat the contents of the cylinder rather than to facilitate combustion of an air-fuel mixture in the cylinder. By providing one or more sparks to the cylinder the contents of the cylinder may be at least partially warmed so that some of the contents of the cylinder may improve fuel vaporization during a subsequent combustion cycle. For example, one or more sparks may be delivered before fuel is injected to a cylinder or so that the possibility of combustion in the cylinder during the cylinder cycle is reduced (e.g., spark timing as shown in the first cylinder cycle of FIG. 5). Method 800 proceeds to 804 after a number of cylinder cycles to delay initial spark and fuel is determined.

At 804, method 800 determines a cylinder cycle delay or number of engine events to occur before a first spark that initiates combustion for in an engine cylinder is provided to an engine cylinder. A delay is determined for each engine cylinder, and the engine events may be comprised of cylinder cycles, cylinder strokes, or fuel injection events. In one example, a delay for a spark that initiates combustion in a cylinder for a first time since engine stop is included in a table that may be indexed via an alcohol content of the fuel delivered to the engine, engine temperature, and a number of engine events. The delay may be empirically determined and stored in the table. In one example, spark that initiates combustion in the cylinder is delayed for one complete engine cycle since engine stop so that each cylinder may rotate through one compression stroke. In other examples, spark that initiates combustion in the engine cylinder may be delayed for a predetermined number of engine or cylinder cycles since engine stop. For example, spark that initiates combustion in a cylinder may be delayed for one complete cycle when engine temperature is less than 18° C. and when the alcohol concentration in fuel supplied to the engine is greater than 20% of the total fuel supplied to the engine during a cylinder cycle. On the other hand, spark that initiates combustion in a cylinder may not be delayed when engine temperature is greater and 40° C. and when the alcohol concentration in fuel supplied to the engine is greater than 20%. Thus, during the second set of conditions, spark is delivered at a first opportunity to combust an air-fuel mixture at a specified crankshaft angle. By adjusting the delay of spark that initiates combustion in the engine, it has been determined that misfires during engine starting can be reduced during cold starting of an engine fueled with fuel that contains alcohol. Accordingly, fuel may be injected and no spark provided during one or more cylinder cycles. Method 800 proceeds to 806 after determining a number of cylinder cycles to delay spark that initiates combustion in the engine.

At 806, method 800 counts a number of engine events since engine stop. As mentioned, engine events may include but are not limited to cylinder cycles, engine cycles, combustion events, spark events, and injection events. For each engine event that occurs, the engine event counter is incremented so that spark can be delivered according to a table that specifies spark in response to engine events. Method 800 proceeds to 808 after the number of engine events are counted.

At 808, method 800 begins to output spark that does not participate in combustion for the present engine cycle. The first spark delivered to an engine cylinder after an engine stop is determined at 802.1ƒ the first spark delivered to the engine is not a spark that participates in combustion of an air-fuel mixture in the cylinder as determined at 804, spark is delivered to the cylinder at a crankshaft angle that has a low propensity for combusting an air-fuel mixture. For example, if it is determined that spark is to be delivered during an engine or cylinder cycle and the spark is not to participate in combustion spark can be delivered before fuel is injected to the cylinder. In this way, the spark may increase the temperature of cylinder contents without combusting an air-fuel mixture. After outputting spark in the present cylinder cycle that does not participate in combustion during the present cylinder cycle, method 800 proceeds to 810.

At 810, method 800 judges whether or not the number of engine events is greater than a threshold amount for spark that initiates combustion as is determined at 804. If the number of engine events is greater than a threshold amount, method 800 proceeds to 812. Otherwise, method 800 proceeds to 808.

At 812, method 800 begins to output spark during a cylinder cycle that participates in combustion during the same cylinder cycle after an engine stop and after engine rotation begins. In some examples, multiple sparks may be output to a cylinder during a single cylinder cycle (e.g., see FIG. 5), and one or more of the sparks may participate in combustion of an air-fuel mixture in a cylinder of the engine. Once spark is delivered for combustion, spark delivery continues until the engine is stopped or until deactivated by the controller during deceleration fuel shut-off or similar condition. Method 800 exits after spark delivery of spark participating in combustion begins.

Referring now to FIG. 9, a flowchart for adjusting spark timing of an engine for engine starting is shown. At 902, method 900 determines a number of sparks for each cylinder during cycle of the cylinder. In one example, a number of sparks delivered to a cylinder is determined from a table of empirically determined data in response to a number of engine events (e.g., cylinder cycles, cylinder strokes, or engine cycles), a concentration of alcohol in a fuel delivered to the engine, and engine temperature. The table outputs a number of sparks according the cell within the table that is indexed via the concentration of alcohol in the fuel, the number of engine events, and engine temperature. In some examples, the number of sparks during a cylinder cycle may also be adjusted to account for whether or not one or more sparks in the cylinder cycle is to participate in combustion during the present cylinder cycle in which the spark is delivered. Whether or not a spark participates in combustion may be determined according to a number of engine events and 802 and 804 of the method of FIG. 8. Method 900 proceeds to 904 after a number of sparks for each cylinder in the present engine cycle is determined. In some examples, the number of sparks delivered during a cylinder cycle may be determined during one or more cylinder cycles before the spark is actually delivered to a cylinder so as to ready sparks for the cylinder cycle.

At 904, method 900 determines the crankshaft angle for first and last sparks delivered during a cylinder cycle. In one example, the location of the first and last sparks may be empirically determined and stored in two tables that outputs spark when indexed by engine speed, engine load, and the concentration of alcohol in fuel delivered to the engine. Thus, as engine operating conditions and alcohol content of fuel varies, the timing of a first spark and a last spark during a cylinder cycle may be varied. In one example, the timing of the first spark may be set to a crankshaft angle that occurs before a time when fuel is injected to the engine. In this way, the first spark during a particular cylinder may act to increase a temperature of the contents of the cylinder. The last spark during a cylinder cycle may be provided when fuel is being injected or after fuel injection has terminated for the cylinder cycle. Method 900 proceeds to 906 after the timing of first and last sparks for a cylinder are determined.

At 906, method 900 counts the number of engine events since engine stop. The engine events may include but are not limited to cylinder strokes, cylinder cycles, and engine cycles. Each time an engine event is observed an engine event counter is incremented. Method 900 proceeds to 908 after the number of engine events are counted.

At 908, method 900 adjusts a number of sparks delivered to a cylinder in response to a number of counted engine events. The a number of sparks for a particular cylinder cycle is determined at 902, and the number of sparks output to a cylinder is adjusted and output to the engine cylinder at 908 via reducing coil charge electrical pulses, for example. During one start, method 900 may output five sparks to a single cylinder during a single cycle of the cylinder. During a subsequent cylinder cycle method 900 may output four sparks to the single cylinder in a single cylinder cycle. Method 900 returns to 906 after adjusting the number of sparks output to a cylinder.

At 910, method 900 judges if a number of engine events greater than a threshold amount have occurred. If a number of engine events since engine stop is less than a threshold amount, method 900 returns to 902. At 902, the number of sparks delivered to a single cylinder during a cylinder cycle and the timing of sparks for the single cylinder continues to be adjusted for each cylinder cycle. However, if the number of engine events since engine stop is greater than the threshold amount, method 900 transitions to an alternative spark strategy.

At 912, method 900 transitions to an alternative spark strategy. For example, spark may be adjusted in response to engine speed, engine torque demand, and observed engine knock. Method 900 exits after transitioning to an alternative spark strategy.

It should be noted that the methods of FIGS. 6-9 may adjust spark timing, start of spark, and compression ratio on a cylinder by cylinder basis or on the engine as a whole. Further, compression ratio, spark timing, and start of spark for each cylinder may be adjusted independently during an engine start.

Thus, the methods of FIGS. 6-9 provide for A method for starting an engine, comprising: adjusting an effective compression ratio of a cylinder and an amount of residual exhaust gas in the cylinder of the engine in response to a number of combustion events since engine stop and a concentration of alcohol in a fuel supplied to the cylinder during a first engine start; and adjusting the effective compression ratio to a compression ratio less than the compression ratio during the first engine start, and adjusting an amount of residual exhaust gas in the cylinder during the second engine start to less than the amount of residual exhaust gas in the cylinder during the first engine start during a second engine start where a concentration of alcohol in a fuel supplied to the cylinder during the second engine start is less than the concentration of alcohol in the fuel supplied to the cylinder during the first engine start. The method can further comprise adjusting at least one of the effective compression ratio and the amount of exhaust gas in the cylinder during the second engine start in response to a number of combustion events since engine stop during the second engine start. Consequently, flow into and through engine cylinders can be adjusted according to engine events in addition to or independent of time. The method includes where adjusting the effective compression ratio during the first engine start includes advancing or retarding a cam to increase the effective compression ratio. The method further comprises providing a plurality of sparks in the cylinder during the first engine start, at least one spark of the plurality of sparks occurring before fuel is injected to the cylinder during a cylinder cycle. By providing a plurality of sparks, a portion of spark energy may heat the contents of a cylinder while a different portion of the spark energy ignites an air-fuel mixture in the cylinder. The method includes where the plurality of sparks is comprised of a number of sparks, and where the number of sparks is responsive to a concentration of alcohol in the fuel. Thus, the number of sparks can increase with the concentration of alcohol of the fuel supplied to the engine. The method includes where a first spark of the plurality of sparks is advanced relative to crankshaft timing from cylinder cycle to cylinder cycle as a concentration of alcohol in the fuel increases. The method also includes where adjusting the effective compression ratio during the second engine start includes advancing or retarding a cam to decrease the effective compression ratio.

In addition, the methods of FIGS. 6-9 provide for a method for starting an engine, comprising: adjusting an effective compression ratio and an amount of residual exhaust gas in a cylinder of the engine in response to a number of combustion events since engine stop and a concentration of alcohol in a fuel supplied to the cylinder; fueling the cylinder during a first cylinder cycle without combusting an air-fuel mixture in the cylinder during the first cylinder cycle; and fueling the cylinder during a second cylinder cycle and combusting an air-fuel mixture in the cylinder during the second cylinder cycle. The method also includes where the first cylinder cycle is a first or second cycle of the cylinder since engine stop, and where the second cylinder cycle is a second or third cycle of the cylinder since engine stop. Thus, fuel can be injected while combustion is delayed for a predetermined number of engine or cylinder cycles. The method further includes where the second cylinder cycle is after the first cylinder cycle, and further comprising providing a spark in the cylinder during the first cylinder cycle. The method further comprises providing a spark during the second cylinder cycle to combust the air-fuel mixture. The method also includes where a timing and amount of fuel injected during the first cylinder cycle is a different timing than a timing and amount of fuel injected during the second cylinder cycle. The fuel injection timing may be adjusted to improve fuel vaporization during engine starting. The method further comprises adjusting the effective compression ratio in response to a temperature of the engine and barometric pressure. In some example, the method further comprises adjusting the effective compression ratio of the engine before an engine stop to an effective compression ratio that is applied during engine cranking. In this way, the engine compression ratio can be set after the engine is commanded off but while the engine is still rotating. Such operation may be desirable for hydraulically operated cam phase control mechanisms.

The methods of FIGS. 6-9 further provide for starting an engine, comprising: during a first engine start, adjusting an effective compression ratio and an amount of residual exhaust gas in a cylinder of the engine in response to a concentration of alcohol in a fuel supplied to the cylinder and a temperature of the engine; providing a plurality of engine sparks to the cylinder during a cylinder cycle of the first engine start where at least a first spark of the plurality of sparks is initiated during the cylinder cycle before fuel is injected to the cylinder; and during a second engine start, adjusting the effective compression ratio to a compression ratio less than the compression ratio during the first engine start, and initiating at least a first spark after injecting fuel to the cylinder during a cylinder cycle of the second engine start. The method includes where the second engine start is an engine start where a temperature of the engine is a higher temperature than a temperature of the engine during the first engine start. Thus, one engine start may be during cold conditions while another engine start may be during warm conditions. The method further comprises injecting fuel to the cylinder and not combusting a first air-fuel mixture during the cylinder cycle of the first engine start, where the cylinder cycle is a first cylinder cycle. Thus, fuel may be injected and not combusted during the cylinder cycle in which it is combusted. The method further comprises injecting fuel to the cylinder and combusting an air-fuel mixture in the cylinder during a second cylinder cycle, the second cylinder cycle immediately following the first cylinder cycle. The method includes where the effective compression ratio is adjusted by adjusting a timing of a cam relative to crankshaft timing.

The methods described by FIGS. 6-9 may be executed substantially simultaneously by a controller during an engine start, or the routines may be executed independently, if desired.

As will be appreciated by one of ordinary skill in the art, routines described in FIGS. 6-9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method for starting an engine, comprising:
adjusting an effective compression ratio of a cylinder and an amount of residual exhaust gas in the cylinder of the engine in response to a number of combustion events since engine stop and a concentration of alcohol in a fuel supplied to the cylinder during a first engine start; and
adjusting the effective compression ratio to a compression ratio less than the compression ratio during the first engine start, and adjusting an amount of residual exhaust gas in the cylinder during the second engine start to less than the amount of residual exhaust gas in the cylinder during the first engine start during a second engine start where a concentration of alcohol in a fuel supplied to the cylinder during the second engine start is less than the concentration of alcohol in the fuel supplied to the cylinder during the first engine start.

2. The method of claim 1, further comprising adjusting at least one of the effective compression ratio and the amount of exhaust gas in the cylinder during the second engine start in response to a number of combustion events since engine stop during the second engine start.

3. The method of claim 1, where adjusting the effective compression ratio during the first engine start includes advancing or retarding a cam to increase the effective compression ratio.

4. The method of claim 1, further comprising providing a plurality of sparks in the cylinder during the first engine start, at least one spark of the plurality of sparks occurring before fuel is injected to the cylinder during a cylinder cycle.

5. The method of claim 4, where the plurality of sparks is comprised of a number of sparks, and where the number of sparks is responsive to a concentration of alcohol in the fuel.

6. The method of claim 5, where a first spark of the plurality of sparks is advanced relative to a crankshaft timing from cylinder cycle to cylinder cycle as a concentration of alcohol in the fuel increases.

7. The method of claim 1, where adjusting the effective compression ratio during the second engine start includes advancing or retarding a cam to decrease the effective compression ratio.

8. A method for starting an engine, comprising:
adjusting an effective compression ratio and an amount of residual exhaust gas in a cylinder of the engine in response to a number of combustion events since engine stop and a concentration of alcohol in a fuel supplied to the cylinder;
fueling the cylinder during a first cylinder cycle without combusting an air-fuel mixture in the cylinder during the first cylinder cycle; and
fueling the cylinder during a second cylinder cycle and combusting an air-fuel mixture in the cylinder during the second cylinder cycle.

9. The method of claim 8, where the first cylinder cycle is a first or second cycle of the cylinder since engine stop, and where the second cylinder cycle is a second or third cycle of the cylinder since engine stop.

10. The method of claim 8, where the second cylinder cycle is after the first cylinder cycle, and further comprising providing a spark in the cylinder during the first cylinder cycle.

11. The method of claim 8, further comprising providing a spark during the second cylinder cycle to combust the air-fuel mixture.

12. The method of claim 8, where a timing and quantity of injecting fuel during the first cylinder cycle are a different timing and quantity than a timing and quantity of injecting fuel during the second cylinder cycle.

13. The method of claim 8, further comprising adjusting the effective compression ratio in response to a temperature of the engine.

14. The method of claim 8, further comprising adjusting the effective compression ratio in response to barometric pressure.

15. The method of claim 8, further comprising adjusting the effective compression ratio before an engine stop to an effective compression ratio that is applied during engine cranking.

16. A method for starting an engine, comprising:
    during a first engine start,
        adjusting an effective compression ratio and an amount of residual exhaust gas in a cylinder of the engine in response to a concentration of alcohol in a fuel supplied to the cylinder and a temperature of the engine;
        providing a plurality of engine sparks to the cylinder during a cylinder cycle of the first engine start where at least a first spark of the plurality of sparks is initiated during the cylinder cycle before fuel is injected to the cylinder; and
    during a second engine start,
        adjusting the effective compression ratio to a compression ratio less than the compression ratio during the first engine start, and initiating at least a first spark after injecting fuel to the cylinder during a cylinder cycle of the second engine start.

17. The method of claim 16, where the second engine start is an engine start where a temperature of the engine is a higher temperature than a temperature of the engine during the first engine start.

18. The method of claim 16, further comprising injecting fuel to the cylinder and not combusting a first air-fuel mixture during the cylinder cycle of the first engine start, where the cylinder cycle is a first cylinder cycle.

19. The method of claim 18, further comprising injecting fuel to the cylinder and combusting an air-fuel mixture in the cylinder during a second cylinder cycle, the second cylinder cycle immediately following the first cylinder cycle.

20. The method of claim 16, where the effective compression ratio is adjusted by adjusting a timing of a cam relative to crankshaft timing.

* * * * *